United States Patent

Daute et al.

[11] Patent Number: 5,512,134
[45] Date of Patent: Apr. 30, 1996

[54] PROCESS FOR REMOVING PRINTING INKS FROM PRINTED WASTEPAPER OR FROM PAPER CIRCUIT WATERS

[75] Inventors: Peter Daute, Essen; Berthold Schreck, Duesseldorf; Klaus Hornfeck, Mettman, all of Germany

[73] Assignee: Henkel Kommanditgesellschaft auf Aktien, Duesseldorf, Germany

[21] Appl. No.: 256,996

[22] PCT Filed: Jan. 25, 1993

[86] PCT No.: PCT/EP93/00160

§ 371 Date: Jul. 29, 1994

§ 102(e) Date: Jul. 29, 1994

[87] PCT Pub. No.: WO93/15260

PCT Pub. Date: Aug. 5, 1993

[30] Foreign Application Priority Data

Feb. 3, 1992 [DE] Germany ............... 42 03 000.5

[51] Int. Cl.⁶ ............................................. D21C 5/02
[52] U.S. Cl. ................ 162/5; 162/8; 162/199; 210/705; 210/730; 210/732; 210/928
[58] Field of Search .................... 162/5, 8, 190; 210/705, 730, 732, 928

[56] References Cited

U.S. PATENT DOCUMENTS

| | | | |
|---|---|---|---|
| 4,964,949 | 10/1990 | Hamaguchi et al. | 162/5 |
| 5,100,574 | 3/1992 | Urushibata et al. | 162/5 |
| 5,221,433 | 6/1993 | Daute et al. | 162/5 |

FOREIGN PATENT DOCUMENTS

| | | |
|---|---|---|
| 2148590 | 4/1973 | Germany . |
| 3401444 | 7/1984 | Germany . |
| 3839479 | 6/1990 | Germany . |
| 7852705 | 5/1978 | Japan . |
| 9101405 | 2/1991 | WIPO . |
| 9111424 | 8/1991 | WIPO . |

OTHER PUBLICATIONS

Ullmanns Encyclopädue der technischen Chemie, 4th Edition, vol. 17, pp. 570–571 (1979).
"Wochenblatt für Papierfabrikation" 17, 646 to 649 (1985).
Chem. Abstr. 89, 131445j (1978).
"Ullmanns Enzyklopädie der Technischen Chemie", vol. 23, 4th Edition, Weinheim 1983, p. 447.
"Das Leder", 1978 (29) 73–81, 1981 (32), 189–198 and 1982 (33), 125–131.

Primary Examiner—Karen M. Hastings
Attorney, Agent, or Firm—Ernest G. Szoke; Wayne C. Jaeschke; John Daniel Wood

[57] ABSTRACT

A process for removing printing inks from printed wastepaper in the presence of a deinking chemical is provided. In this process printed wastepaper is disintegrated to form a paper stock suspension and the detached printing ink particles are removed in known manner by flotation or washing in another stage. In this process, alkoxylates of blown oils are used as the deinking chemical. The deinking chemical is added during disintegration and/or before the flotation or washing step. Preferably, the printed wastepaper is disintegrated in the presence of 0.02 to 2% by weight and preferably 0.1 to 0.8% by weight, based on air-dry paper stock, of alkoxylates of blown oils. This deinking chemical also removed printing inks from paper circuit waters.

18 Claims, No Drawings

PROCESS FOR REMOVING PRINTING INKS FROM PRINTED WASTEPAPER OR FROM PAPER CIRCUIT WATERS

BACKGROUND OF THE INVENTION

1. Field of the Invention

This invention relates to a process for the removal of printing inks from printed wastepaper in the presence of alkoxylates of blown oils as deinking chemicals. The invention also relates to the use of these special deinking chemicals for the removal of printing inks from printed wastepaper.

2. Discussion of Related Art

Today, wastepaper is used in large quantities for the production of, for example, newsprint and sanitary paper. Lightness and color are important quality features for papers of this type. To achieve this, the printing inks have to be removed from the printed wastepaper. This is normally done by deinking processes. These processes are carried out in conventional installations for the recycling of wastepaper which are equipped with additional facilities for removing the detached printing ink particles. Two important steps in the deinking process are:

(1) Disintegration of the wastepaper. Disintegration is the process in which the wastepaper is fiberized. It may be induced, for example, in aqueous medium by application of mechanical energy (stirring). Fiberizing is accompanied by detachment of the printing ink particles. The disintegration step gives a paper stock suspension in the form of a grey pulp. (2) Removal of the detached printing ink particles from the paper stock suspension. This step of the deinking process may be carried out by washing or flotation [cf. for example *Ullmanns Encyclopädie der technischen Chemie*, 4th Edition, Vol. 17, pages 570 –571 (1979)].

The deinking of wastepaper is normally carried out at alkaline pH values in the presence of alkali metal hydroxides, alkali metal silicates, oxidative bleaches and surfactants at temperatures in the range from 30° to 50° C. Anionic and/or nonionic surfactants, for example soaps, ethoxylated fatty alcohols and/or ethoxylated alkyl phenols, are mainly used as surfactants [cf. for example "Wochenblatt für Papierfabrikation" 17, 646 to 649 (1985)].

German patent application DE 34 01 444 relates to a process for the deinking of wastepaper using a compound corresponding to the following general formula

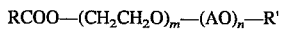

in which R is a $C_{7-21}$ alkyl or alkenyl group, R' is a hydrogen atom or a $C_{1-18}$ alkyl, alkenyl or acyl group, AO represents $C_3H_6O$ or $C_4H_8O$ groups or a mixture of $C_2H_4O$, $C_3H_6O$ and $C_4H_8O$ groups, m is an integer of 1 to 100 and n is an integer of 1 to 100.

The use of ethoxylated castor oils for the deinking of printed wastepaper is known from JP 78/52705, reported in Chem. Abstr. 89, 131445j (1978), and from DE 21 48 590. The Japanese patent describes mixtures of castor oil with 10 to 400% ethylene oxide and ethoxylated nonylphenol which are suitable for the removal of printing inks from printed wastepaper. The process protected in DE-PS 21 48 590 is concerned with organic materials, for example paper, which are bleached with sodium chlorite in the presence of organic compounds containing at least one ethylene oxide and/or propylene oxide unit. Suitable organic compounds containing at least one alkylene oxide unit include inter alia ethoxylated castor oil.

DESCRIPTION OF THE INVENTION

However, where ethoxylated castor oils are used for removing printing inks from wastepaper, it has to be accepted that the quantities of castor oil and, hence, ethoxylated castor oils available on the market are subject to considerable fluctuations. Poor harvests in the main areas of cultivation, namely Brazil and India, result in shortages of the starting material, castor oil, at more or less long intervals. Accordingly, there is a need for a substitute for ethoxylated castor oils which, when used for the removal of printing inks from wastepaper, would be at least comparable with the product to be replaced in regard to the deinking results obtained. Above all, the substitute product would be readily obtainable from a broader raw material base less vulnerable to crises and would be both ecologically and toxicologically safe.

It has now been found that alkoxylates of blown oils prepared by addition of alkylene oxides, for example ethylene and/or propylene oxide, onto blown oils are eminently suitable as a substitute of ethoxylated castor oils for removing printing ink from wastepaper. It has also been found that printing inks can also be removed with good results from paper circuit waters with these compounds.

Accordingly, the present invention relates to a process for the removal of printing inks from printed wastepaper in the presence of a deinking chemical, in which printed wastepaper is disintegrated into a paper stock suspension and the detached printing ink particles are removed in known manner by flotation or washing in a further stage, characterized in that alkoxylates of blown oils are used as the deinking chemical.

In the context of the invention, the "deinking chemical" is understood to be a substance which causes or supports the detachment of printing ink particles from printed wastepaper and facilitates subsequent removal of the detached printing ink particles.

The present invention also relates to the use of alkoxylates of blown oils for removing printing inks from printed wastepaper.

DETAILED DESCRIPTION OF THE INVENTION

The alkoxylates of blown oils to be used in accordance with the invention are prepared in known manner by reaction of alkylene oxides, for example ethylene or propylene oxide, with blown oils. Blown oils are understood to be the reaction products obtained in the reaction of drying oils with air or oxygen. This reaction is normally known as blowing and gives hydroperoxides, cf. *"Ullmanns Enzyclopädie der Technischen Chemie"*, Vol. 23, 4th Edition, Weinheim 1983, page 447.

Extensive literature is available on the products of oxidation of natural fats and oils in air, including in particular the deterioration of edible fats in the presence of air and light at normal temperatures. The autoxidation of fish oil was systematically investigated above all by F. J. Elsinger (Versuchsantalt für Lederindustrie, Vienna), cf. for example "Das Leder", 1978 (29) 73–81, 1981 (32), 189–198 and 1982 (33), 125–131. Elsinger oxidized with air for prolonged periods at temperatures of 60° to 100° C. In his very first work, he pointed to peroxides, more particularly hydroperoxides, as primary products of the autoxidation of fish oil from which secondary products could then be formed by molecular degradation, molecular variation or molecular enlargement.

The hydroperoxides formed during the blowing reaction are relatively stable. However, they undergo various secondary reactions with increasing reaction time, the carbon chain of the fatty acid units of the particular oil either remaining intact or varying. If the carbon chain remains intact, dihydroperoxides, isomeric peroxides, alcohols and epoxides in particular are formed. In the event of cleavage of carbon bonds, aldehydes for example can be formed. Since, in addition, C=C double bonds are split during the reaction, the iodine value of the blown product is lower than the iodine value of the oil used. In addition, the blown oils have higher densities and viscosities than the starting oils.

Blown oils which are produced over reaction times of 1 to 13 hours and preferably 3 to 6 hours at temperatures of 60° to 150° C. are used for producing the alkoxylates of blown oils according to the invention. For example a heatable tube reactor may be charged with the oil to be blown and the oil subsequently contacted with oxygen or air at temperatures of 60° to 150° C. The air may be introduced, for example, through a sieve plate at the bottom of the tube reactor. The blowing times are 1 to 13 hours and preferably 3 to 6 hours. The increase in density and viscosity during the blowing reaction may readily be used to establish the particular degree of blowing required either in the laboratory or on an industrial scale.

Examples of blown oils are blown fish oil, blown rapeseed oil and blown soybean oil. Many blown oils are commercially available products.

The alkoxylates of blown oils may be prepared in known manner by reaction of blown oils with alkylene oxides at elevated temperature in the presence of the usual alkoxylation catalysts known from the prior art, such as sodium methanolate.

The process step in which the deinking chemical is added within the deinking process as a whole is not subject to any particular limitations. For practical reasons, however, it may be advisable either to introduce the deinking chemical directly during disintegration in the so-called pulper or to add it before the washing or flotation step.

In one preferred embodiment of the invention, the alkoxylates of blown oils are preferably added to the paper stock suspensions in quantities of 0.02 to 2% by weight and more preferably in quantities of 0.1 to 0.8% by weight, based on air-dry paper stock. Air-dry paper stock means that an equilibrium state of internal moisture has established itself in the paper stock. This equilibrium state depends upon the temperature and upon the relative air humidity.

It is of particular advantage to use alkoxylates of blown oils in which the oxyalkylene component makes up from 20 to 95% by weight and preferably from 50 to 80% by weight in the process according to the invention. It is particularly preferred to use ethoxylates, propoxylates and/or butoxylates of blown oils; ethoxylates and/or propoxylates of blown oils are particularly suitable.

In many cases, the degree of removal of printing inks from printing wastepaper can be increased by using the alkoxylates of blown oils according to the invention in combination with, for example, $C_{10-22}$ fatty acids or alkali metal or alkaline earth metal salts thereof, ethoxylated $C_{6-22}$ alkyl alcohols, ethoxylated alkylphenols, cationic polymers, for example polydimethylaminoethyl methacrylate and/or copolymers, for example those described DE 38 39 479. The fatty acids mentioned or salts thereof and cationic polymers are particularly suitable. The total quantity of these optional constituents is between 0.05 and 1% by weight, based on air-dry paper stock.

Where a combination of the alkoxylates of blown oils according to the invention with $C_{10-22}$ fatty acids or alkali metal or alkaline earth metal salts thereof are used, it has proved to be favorable to use the fatty acids or their salts in a quantity of 0.2 to 1.0% by weight, based on air-dry paper stock. Combinations in which the ratio by weight of fatty acids or salts thereof and the alkoxylates of blown oils is approximately 2:1 are particularly suitable.

In the presence of alkoxylates of blown oils, printing inks, for example rotary newsprint inks, book printing inks, offset printing inks, illustration intaglio printing inks, flexographic printing inks, laser printing inks and/or packaging intaglio printing inks, may be removed from printed wastepaper, for example newspapers, magazines, computer paper, journals, brochures, forms, telephone directories and/or catalogs. The wastepaper deinked in the presence of the compounds to be used in accordance with the invention is distinguished by very high degrees of whiteness.

The printing inks may be removed from wastepaper, for example, by the following process: Printed wastepaper is refined in a pulper at 20° to 60° C. at a stock consistency of, for example, 0.5 to 5% by weight in an aqueous solution typically containing 0 to 1.5% by weight of hydrogen peroxide (100%), 0 to 2.5% by weight of sodium hydroxide (99% by weight), 0 to 4.0% by weight of soda waterglass, solids content 35% by weight, 0.02 to 2% by weight of the alkoxylates of blown oils according to the invention and 0 to 1% by weight of the optional constituents mentioned above (all percentages by weight based on air-dry wastepaper). After a residence time of typically 60 to 120 minutes at temperatures in the range from 20° to 60° C., the paper stock suspensions are stirred into water or water is added to them so that 0.6 to 1.6% by weight stock suspensions are obtained. The detached printing ink particles are then removed from the stock suspensions in known manner by washing out or by flotation. Flotation is preferably carried out in known manner, for example in a Denver flotation cell (laboratory scale).

If water-based flexographic inks are to be removed from wastepaper, it is advisable to modify the process to the extent that the alkoxylate of a blown oil is used in combination with a cationic polymer and the polymer is added immediately before the flotation step.

By using alkoxylates of blown oils, printing inks can be removed both from wastepaper and from the circuit water. However, the compounds to be used in accordance with the invention may also be used for the separate cleaning of paper circuit waters. In this case, the printing ink particles are removed, for example by filtration or flotation, after the addition of 2 to 100 mg of alkoxylates of blown oils per liter of circuit water.

The following Examples are intended to illustrate the invention without limiting it in any way.

EXAMPLES

1. Substances and materials used
1.1. Blown oils

Blown fish oil: a product of Böhme Fettchemie

Blown rapeseed oil: a product of Henry Lamotte (Bremen)

Blown soybean oil: a product of Akzo Chemicals GmbH 1.2. Ethoxylates of blown oils

Example 1

Ethoxylation of blown fish oil 8 g of a 30% solution of potassium hydroxide in water were added to 390 g of blown fish oil and heated to 100° C. in an autoclave. At this temperature, the traces of methanol present were removed by evacuation and purging with nitrogen as inert gas a total of five times. After the reaction temperature had been increased to 150° C., a total of 610 g of ethylene oxide was added in portions at such a rate that the pressure in the reactor did not exceed a value of 5 bar. On completion of the reaction, the reaction mixture was cooled to 80°–100° C., evacuated for about 15 minutes to remove traces of ethylene oxide present and neutralized with lactic acid. The crude product was a brown liquid (OH value 101).

Example 2

Ethoxylation of blown rapeseed oil 0.6 g of a 50% aqueous potassium hydroxide solution was added to 130 g of blown rapeseed oil, followed by reaction with 204 g of ethylene oxide at 160° C. under the same conditions as in Example 1. After traces of ethylene oxide had been removed in vacuo, followed by neutralization with lactic acid, a brown liquid was obtained (OH value 70).

Example 3

Ethoxylation of blown soybean oil 0.6 g of a 50% aqueous potassium hydroxide solution was added to 130 g of blown soybean oil, followed by reaction with 204 g of ethylene oxide at 160° C. under the same conditions as in Example 1. After traces of ethylene oxide had been removed in vacuo, followed by neutralization with lactic acid, a brown liquid was obtained (OH value 85).

1.3. Air-dry (printed) wastepaper

Daily newspapers and magazines were stored in a drying cabinet for 144 hours at 60° C. and artificially aged in this way. The air-dry wastepaper was shredded, newspapers and magazines being present in a ratio by weight of 1:1. The moisture content of the printed paper shreds was 5.7% by weight.

2. Removal of printing ink from alkaline medium 2.1. Disintegration

An aqueous suspension of 17.5 g of air dry shredded wastepaper with a consistency of 3.5% by weight was introduced into a stirred vessel. After a) 2.0% by weight of soda waterglass with a solids content of 35% by weight (37° to 40° Bé), b) 1.0% by weight of sodium hydroxide (99% by weight), c) 0.7% by weight of hydrogen peroxide (100%) and d) 0.2% by weight of the alkoxylates of blown oils according to the invention (Examples 1 to 3) had been successively added to this suspension (all percentages by weight based on air-dry paper stock), the suspended paper shreds were size-reduced for 10 minutes at 45° C. using a dissolver disk (Pendraulik Labormischer 34). The paper stock obtained in this way was left standing for 105 minutes at 45° C.

2.2. Printing ink flotation (deinking)

The stock obtained in 2.1. was diluted with water to a consistency of 1% by weight. The stock suspension was then floated for 12 minutes at 45° C. in a Denver laboratory flotation cell at 1,000 revolutions per minute. After flotation, the stock was separated from the water on a nutsch filter, formed into a sheet between two filter papers on a photo dry press and dried for 90 minutes at 100C.

The deinking results are shown in Table 1. The deinkability value (DEM) was calculated from the reflection factors $R_{457}$ nm (whiteness) of the printed (BS), deinked (DS) and unprinted (US) paper stocks in accordance with the following formula:

$$DEM\ (\%) = \frac{whiteness\ (DS) - whiteness\ (BS)}{whiteness\ (US) - whiteness\ (BS)} \times 100$$

(0% means no deinking, 100% means quantitative deinking).

In every case, the circuit water was free from printing inks.

TABLE 1

| | Printing ink flotation | | | |
|---|---|---|---|---|
| Compound used prepared in accordance with Example No. | $R_{457}^{1)}$ (US) | $R_{457}^{1)}$ (BS) | $R_{457}^{1)}$ (DS) | DEM (%) |
| 1 | 62.6 | 43.1 | 54.9 | 61 |
| 2 | 62.6 | 41.7 | 52.5 | 52 |
| 3 | 62.6 | 41.7 | 52.6 | 52 |

$^{1)}R_{457} = R_{457}$ nm

We claim:

1. A process for removing printing inks from printed wastepaper comprising in disintegrating printed wastepaper to form a paper stock suspension containing detached printing ink particles and then removing said detached printing ink particles from said paper stock suspension, wherein an alkoxylate of a blown oil is present in said paper stock suspension in an amount effective to deink said paper stock suspension.

2. A process as claimed in claim 1 wherein said alkoxylate of a blown oil is added during disintegration.

3. A process as claimed in claim 1 wherein said printed wastepaper is disintegrated in the presence of 0.02 to 2% by weight by weight, based on air-dry paper stock, of said alkoxylate of a blown oil.

4. A process as claimed in claim 1 wherein said printed wastepaper is disintegrated in the presence of 0.1 to 0.8% by weight, based on air-dry paper stock, of said alkoxylate of a blown oil.

5. A process as claimed in claim 1 wherein said removing is a flotation step.

6. A process as claimed in claim 1 wherein said removing is a washing step.

7. A process as claimed in claim 1 wherein said alkoxylate of a blown oil has oxyalkylene component making up from 20 to 95% by weight of said alkoxylate of a blown oil.

8. A process as claimed in claim 1 wherein said alkoxylate of a blown oil has oxyalkylene component making up from 50 to 80% by weight of said alkoxylate of a blown oil.

9. A process as claimed in claim 1 wherein said alkoxylate of a blown oil is selected from the group consisting of ethoxylates, propoxylates and/or butoxylates of a blown oil.

10. A process as claimed in claim 1 wherein said alkoxylate of a blown oil is selected from the group consisting of ethoxylates and/or propoxylates of a blown oil.

11. A process as claimed in claim 1 wherein said paper stock suspension is further comprised of compounds selected from the group consisting of $C_{10-22}$ fatty acids, alkali metal or alkaline earth metal salts thereof and cationic polymers.

12. A process as claimed in claim 1 wherein water-based flexographic inks are to be removed from said printed wastepaper and wherein a cationic polymer is added to said stock suspension immediately before said removing step.

13. A process of claim 1 wherein said alkoxylate of a blown oil is present in said paper stock suspension in an amount of 0.02 to 2% by weight, based on air-dry paper stock.

14. A process as claimed in claim 1 wherein said alkoxylate of a blown oil is present in said paper stock suspension in an amount of 0.1 to 0.8% by weight, based on air-dry paper stock.

15. A process for removing printing inks from printed wastepaper comprising disintegrating printed wastepaper in the presence of an alkoxylate of a blown oil selected from the group consisting of ethoxylates and/or propoxylates of a blown oil in an amount of 0.02 to 2% by weight, based on air-dry paper stock to form a paper stock suspension containing detached printing ink particles and then removing said detached printing ink particles from said paper stock suspension.

16. A process of removing printing ink particles from paper circuit waters comprising adding an alkoxylate of a blown oil to a paper circuit water containing ink particles in an amount effective to remove said ink particles from said paper circuit water and then removing said ink particles from said paper circuit water.

17. A process of claim 16 wherein said removing is by filtration or flotation.

18. A process of claim 16 wherein 2 to 100 mg of said alkoxylate of a blown oil is added per liter of paper circuit water.

* * * * *